United States Patent

[11] 3,628,490

| [72] | Inventor | Hermann Walter Gehlen<br>Pirmasenser Strasse 60,<br>Kaiserslautern/Pfalz, Germany |
|---|---|---|
| [21] | Appl. No. | 1,393 |
| [22] | Filed | Jan. 8, 1970 |
| [45] | Patented | Dec. 21, 1971 |
| [32] | Priority | Sept. 30, 1969 |
| [33] | | Germany |
| [31] | | P 19 49 206.9 |

[54] AMPHIBIOUS VEHICLE
3 Claims, 9 Drawing Figs.

| [52] | U.S. Cl. | 115/1 B |
| [51] | Int. Cl. | B60f 3/00 |
| [50] | Field of Search | 115/1 |

[56] References Cited
UNITED STATES PATENTS
3,269,349  8/1966  Gehlen ..................... 115/1 B
3,446,176  5/1969  Grange et al. ............. 115/1 B

*Primary Examiner*—Andrew H. Farrell
*Attorney*—Robert H. Jacob

ABSTRACT: An amphibious vehicle adapted particularly as a part of a floating bridge but also deployable as a ferry having a runway portion pivotably movable about a vertical axis which at one end is formed as a ramp pivotable relative to the remaining part of the runway about a horizontal axis extending transversely of the direction of travel, where this ramp is subdivided centrally about a horizontal axis that extends again transversely of the runway about which the outer free half of the ramp can be folded under the inner half thereof and the front end of the runway section thus formed is adapted to be coupled to the corresponding front end of the runway section of an adjacent amphibious vehicle and where the vehicle section pivotable about a vertical axis is also constructed at its other end as a ramp constructed in this manner.

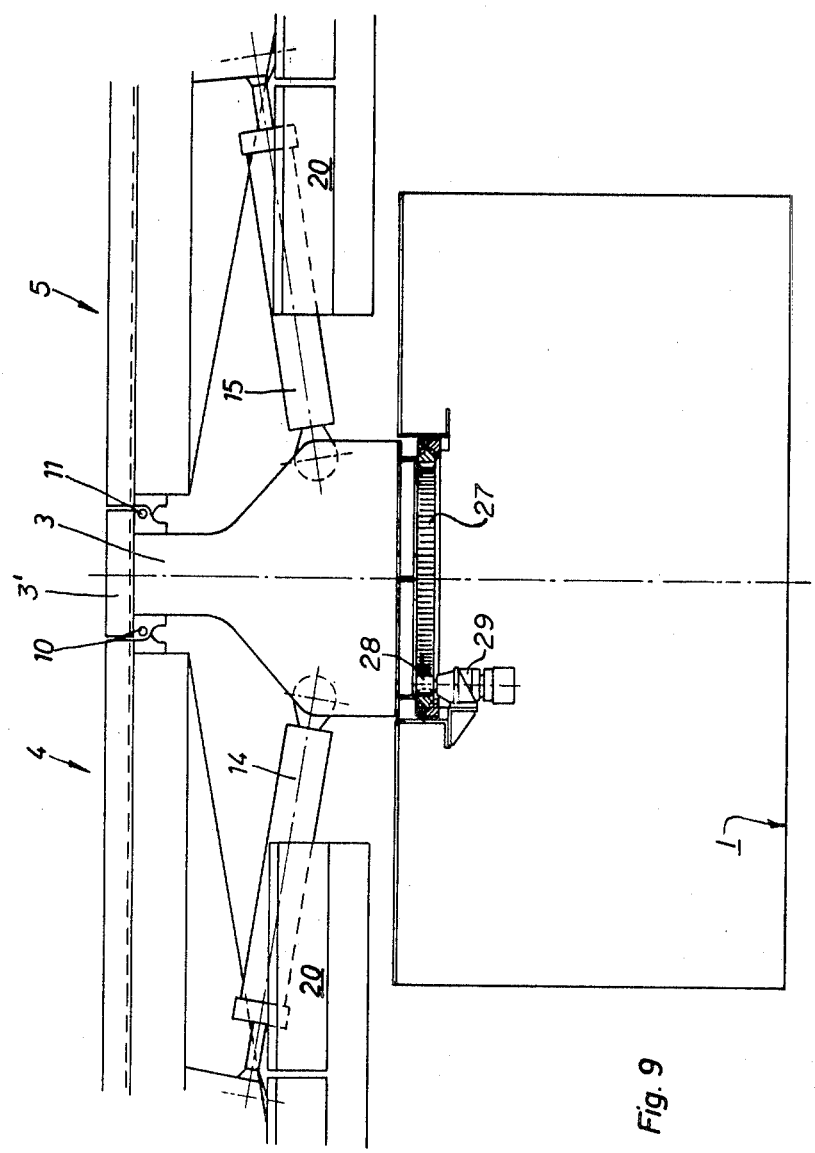

0

AMPHIBIOUS VEHICLE

BACKGROUND OF THE INVENTION

The invention relates to amphibious vehicles, particularly of the type to make up floating bridges and for deployment as a ferry, having a runway portion that is pivotally movable about a vertical axis which is designed at one of its ends as a ramp rotatable about an axis extending transversely to the direction of travel relative to the remaining part of the runway, where this ramp is again subdivided approximately at the center by an axis extending also horizontally transversely relative to the runway and about which the outer free ramp half of the ramp can be folded under its inner half. The front end of the runway section thus formed is adapted to be coupled with the front end of the runway section of the adjacent amphibious vehicle.

By means of this construction of an amphibious vehicle it is made possible to deploy for the bridge as well as also for the ramp stretch of a floating bridge a unitary vehicle which, without any extraneous help and without any additional structural component carried along separately, is capable of being deployed to perform both tasks.

It has been discovered that this type of amphibious vehicle can still be improved upon, especially when it is not only a part of a floating bridge, but also when it is to be deployed as a ferry. When the vehicle is deployed as the end portion of a floating bridge, it is sufficient when it is equipped on one side with a ramp which establishes the connection with the bank or shore of the river. A ferry constructed only on one side with a ramp must however be maneuvered in such a manner as the connection with the land is established, that the side of the ferry having the ramp is located opposite the shore. This requires additional maneuvering activity and therefore also expenditure of time in crossing over a body of water.

SUMMARY OF THE INVENTION

Accordingly it is an object of the present invention to construct an amphibious vehicle in such a manner that without limitation, either individually or in combination with several vehicles, it can be deployed as a ferry which can travel over the body of water to be bridged only in one direction without rotating the vehicle. For this purpose the vehicle requires two oppositely disposed ramps.

In accordance with the invention this problem is solved by means of an amphibious vehicle as described above in that the section of the runway that is pivotable about a vertical axis is equipped at both ends with ramps.

Preferably the runway section comprises two foldable ramps which are supported by a center unit that is pivotable about a vertical axis.

Now the vehicle can be deployed, as aforementioned, as a ferry having two ramps, the vehicle to be ferried over can travel on over one ramp and leave over the oppositely disposed ramp. Furthermore, there is the advantage that the individual vehicle can be deployed as a bridge across small creeks or other obstacles in the terrain.

The two parts of the ramps that are folded together are as usual and as known actuated by hydraulic cylinders. With these hydraulic cylinders it is also possible to fix the ramp parts in place relative to one another in any desired tilted position.

This however is only possible up to a certain limit of load because otherwise the hydraulic cylinders which themselves serve only for the purpose of displacing the ramp portions would have to be of too heavy form of construction. For greater loads it is therefore possible to additionally provide a structure that makes it possible to fix the two ramp parts in relative position to one another in one or also several predetermined tilted positions without placing the load on the actuating cylinder. This can be affected, for example, and preferably, by struts or braces provided at the top side of the two ramp portions within the range of connection and rocking and having perforations into which connecting bolts are inserted.

The invention is described hereinafter with reference to an embodiment schematically illustrated by way of example in the drawings in which:

BRIEF DESCRIPTION OF THE DRAWINGS

FIG. 9 illustrates the electrically driven pinion and gear ring for rotating the ramp section.

DESCRIPTION OF THE INVENTION

Figure 1:
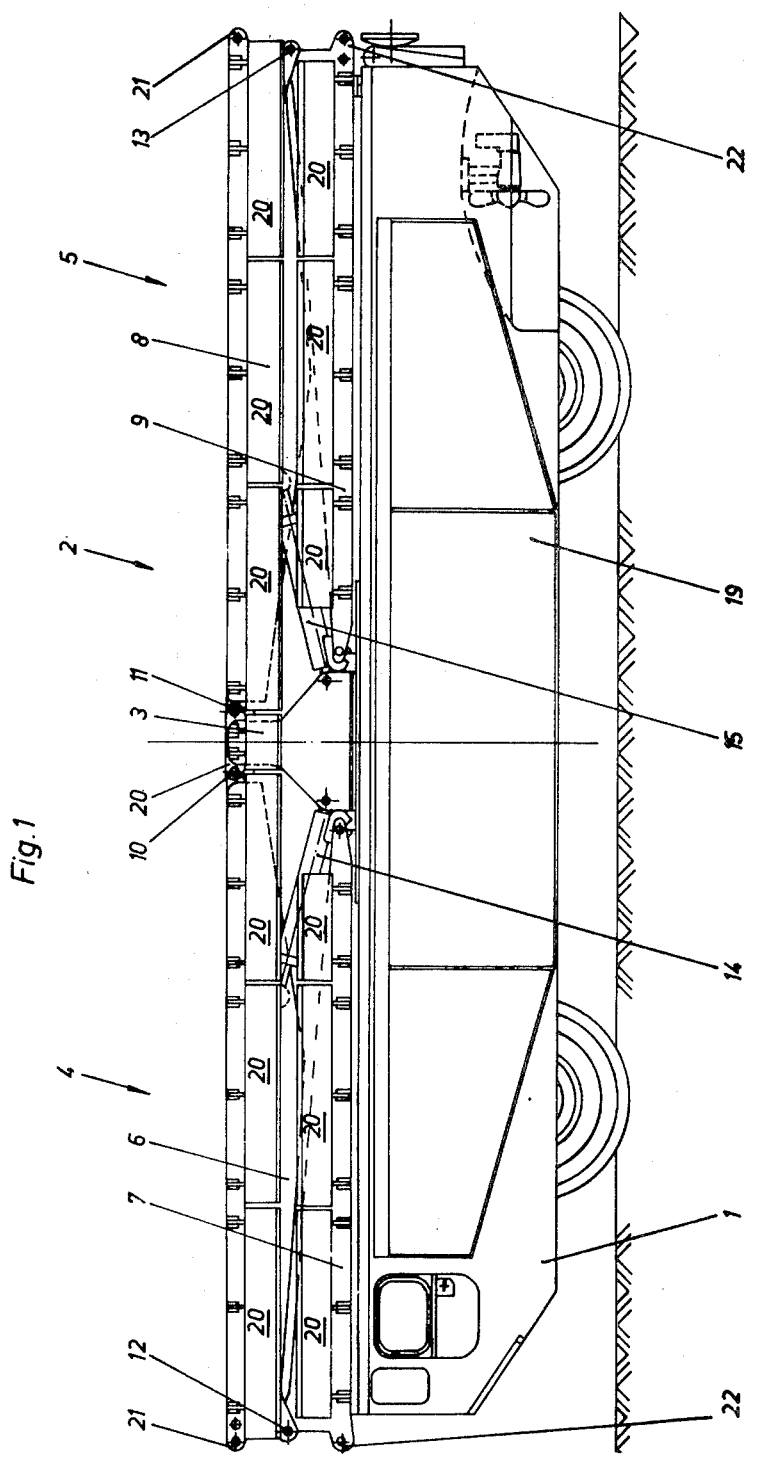
FIG. 1 is a side view of the vehicle in land transportation position.
Figure 2:
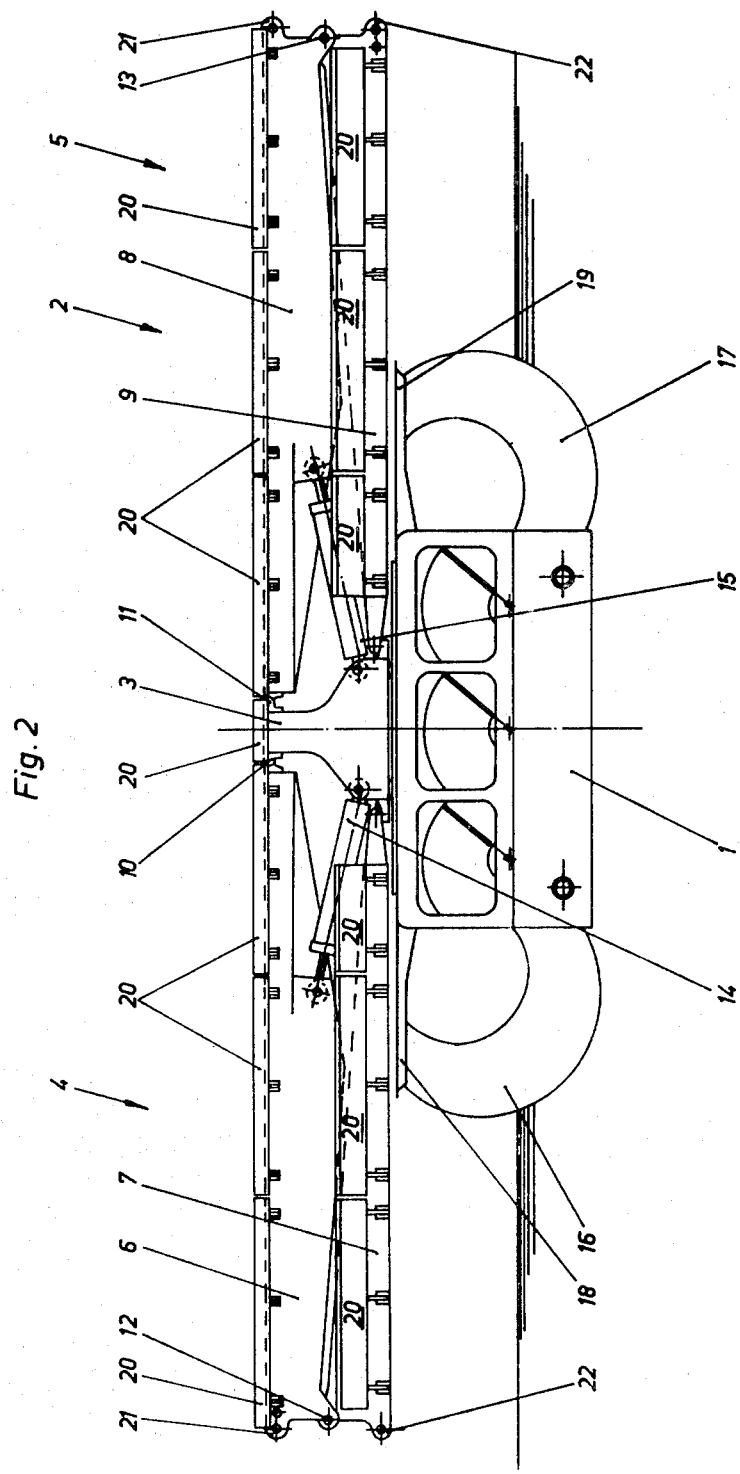
FIG. 2 is a front view of the vehicle in water with the runway and ramp element pivoted about a 90° angle.
Figure 3:
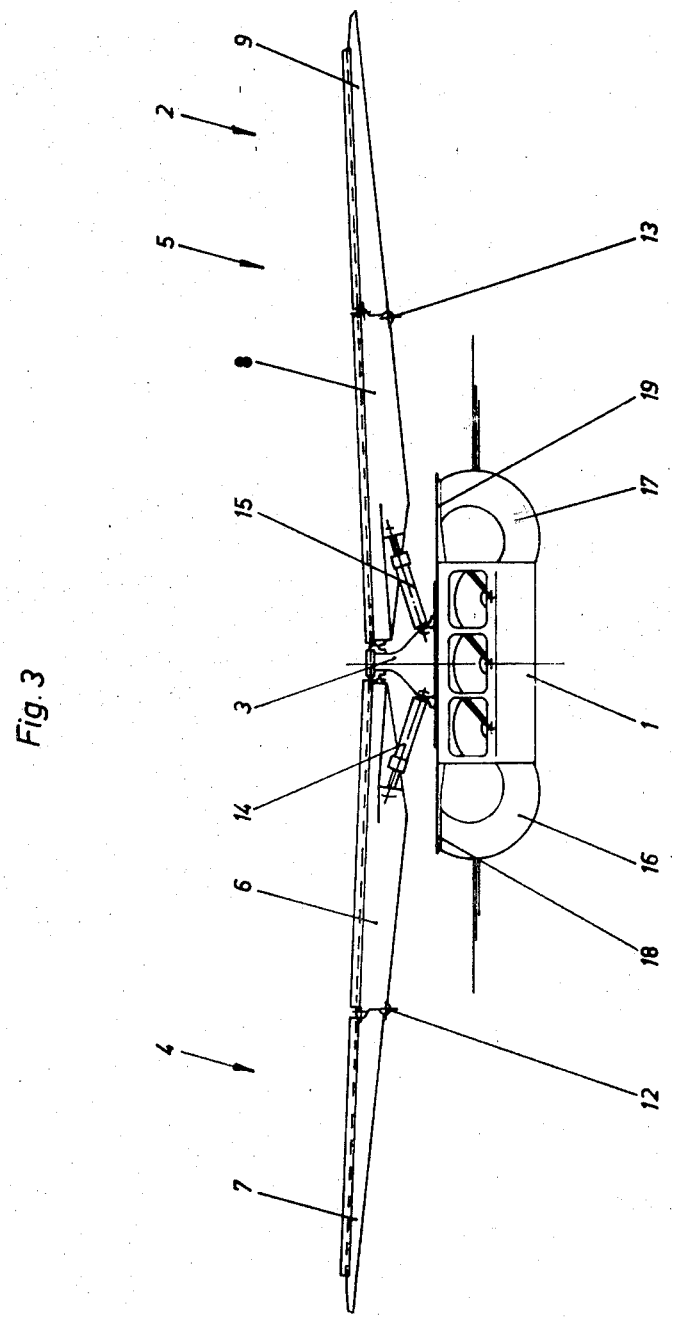
FIG. 3 shows the same view of the vehicle with the ramps unfolded for deployment as a bridge to cross a body of water.
Figure 4:
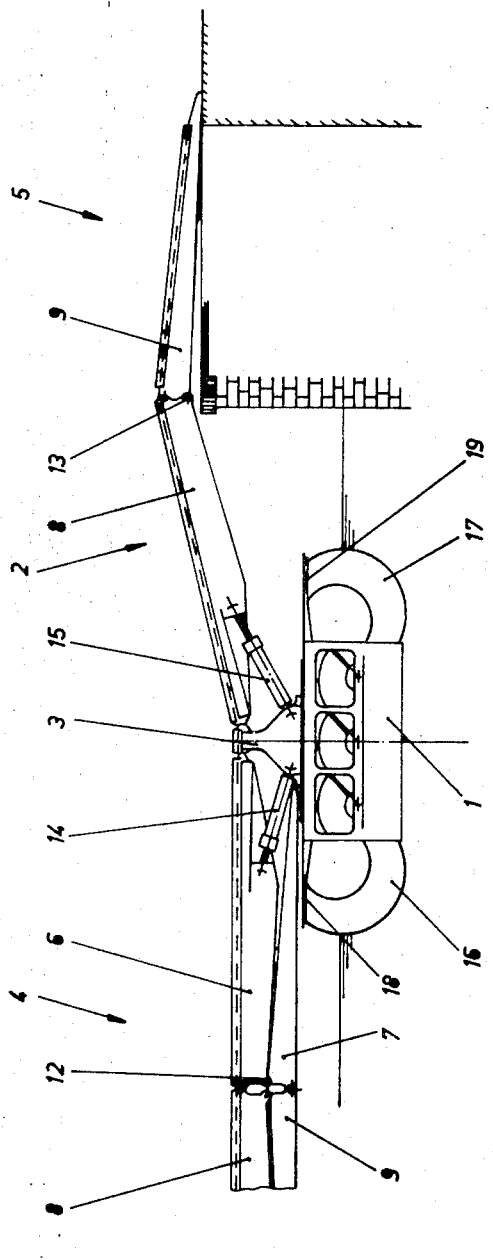
FIG. 4 shows the vehicle is again in the same perspective but as an end element of a floating bridge.

The amphibious vehicle has a buoyant vehicle housing or body 1 in the form of a pontoon which is the main floating body of the vehicle. The vehicle body 1 supports a runway section 2 that has a center portion 3 which is pivotable in a horizontal plane about its vertical center axis and which comprises in addition to this center portion two ramps 4 and 5 which in their turn are subdivided into two ramp portions 6 and 7 or 8 and 9. A portion 3' (FIG. 9) of the runway structure extends over the center portion 3 and connects the ramps 4 and 5.

Both ramps 4 and 5 are of equal form of construction as illustrated. They are linked by means of their ramp portions 6 and 8 to the center part 3 for upward-swinging movement out of their horizontal position about pivot axes 10 and 11. The outer ramp parts 7 and 9 are in turn pivotally connected to the free ends of the ramp portions 6 and 8 for movement about pivot axes 12 and 13. As shown in FIG. 9, mechanism for rotating the center portion 3 on a vertical axis comprises a ring gear 27 secured to the center portion 3, a pinion 28 in mesh with the ring gear and an electric motor 29 on the vehicle body 1 for driving the pinion 28.

Figure 7:
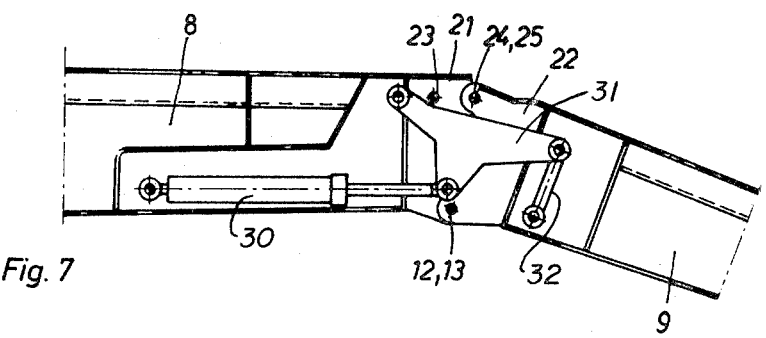
Figure 8:
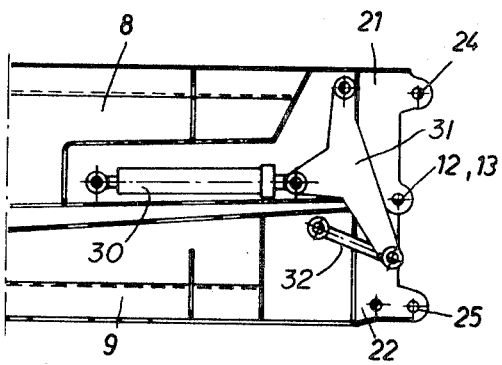
FIG. 8 illustrates the same ramp portions as FIGS. 6 and 7 but in folded condition.

The actuation of the complete ramps is effected by power means such as hydraulic cylinders 14 and 15. The adjustment of the outer ramp parts 7 and 9 relative to their inner ramp parts 6 and 8 is effected by further hydraulic cylinders in the area of the pivot axes 12 and 13. As shown in FIGS. 7 and 8 a hydraulic cylinder 30 is operatively interposed between the inner ramp part 8 and outer ramp part 9 by means of a rocker 31 and link 32 to provide for folding and unfolding of the outer ramp part 9 by contraction and expansion, respectively, of the cylinder 30. The outer ramp part 7 may be folded under and unfolded from the inner ramp part 6 by a duplicate, not shown, of the power means shown FIGS. 7 and 8 for pivoting the outer ramp 9.

The vehicle body 1 can be equipped in a manner known per se with lateral floating bodies 16 and 17 that are inflatable and which disappear during transportation on land below cover flaps 18 and 19.

Furthermore the ramp portions 6, 7, 8 and 9 as well as also the center portion 3 can be equipped in a manner known per se with side portions 20 adapted to be linked on for widening the runway.

Figure 5:
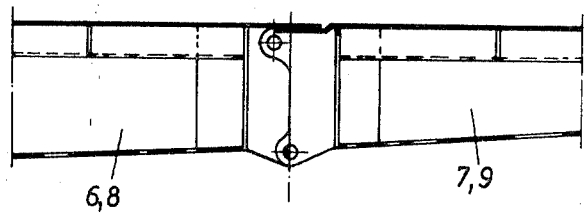
FIGS. 5 and 6 illustrate the arrangement for fixing a tilted setting of the two ramp parts in position with the hydraulic operating means unloaded, FIG. 7 corresponds to FIG. 5 and illustrates the details of the mechanism for moving one ramp portion relative to the other.
Figure 6:
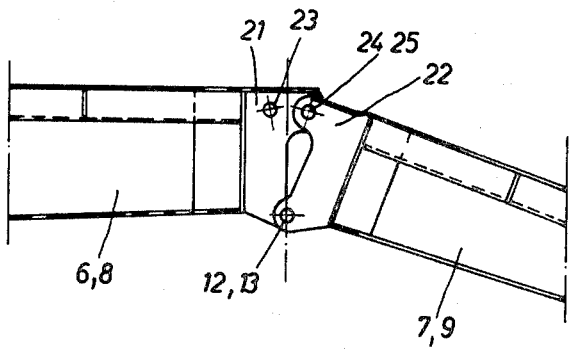

The ramp portions 6, 7, 8 and 9 are equipped with connecting lugs or links 21, 22 for connection with other vehicles. As shown in FIG. 8 the lugs 21, 22 have holes 24 and 25, respectively through which bolts may be inserted for connecting the folded ramp portions 8 and 9 to correspondingly folded ramp portions of another vehicle. Likewise, the folded ramp portions 6 and 7 may be coupled to the folded ramp portions of another vehicle by means of suitably apertured lugs and connecting bolts. The lugs or links 21, 22 can furthermore be constructed as illustrated in FIGS. 5 and 6 in a manner to permit fixing the associated ramp parts 6 and 7 or 8 and 9 in one or more articulated positions. For this purpose the lug 21 of the ramp portions 6 and 8 may be provided with several apertures 23, 24 through which a latching bolt may be inserted when registering is established with a perforation 25 in a lug or link 22 of the ramp parts 7 or 9.

The vehicle is capable of deployment when connected as a part of a floating bridge or as an end element of such a bridge. In addition to that it can also be deployed as an individual vehicle, as floating bridge or also as ferry.

Having now described my invention with reference to the embodiment illustrated, what I desire to protect by letters patent of the United States is set forth in the appended claims.

1. An amphibious vehicle, particularly for putting together floating bridges and for deployment as ferry comprising an amphibious vehicle body, a vertically disposed pivot element mounted on said vehicle body, a runway structure comprising a pair of ramp sections extending transversely of said pivot member in opposite directions, each of said ramp sections being subdivided generally centrally between its ends into an inner and an associated outer portion; hinge means intermediate said pivot member and said inner ramp portions connecting the latter to said pivot member on first horizontal, transverse axes, respectively; power means intermediate said pivot member and said inner ramp portions for moving said inner ramp portions into different angular positions about said first horizontal transverse axes; hinge means interconnecting said inner ramp portions and their associated outer ramp portions on second horizontal transverse axes, respectively; and second power means intermediate each of said inner ramp portions and their associated outer ramp portions whereby said outer ramp portions are movable to different angular positions relative to and are foldable under said inner ramp portions, respectively; said folded portions defining proximate said second transverse axes coupling ends adapted to be coupled with a corresponding coupling end of the runway structure of another vehicle.

2. An amphibious vehicle as set forth in claim 1 and further comprising a runway portion extending over said pivot element and connecting said inner ramp portions.

3. An amphibious vehicle as set forth in claim 2 and further comprising lug means on said inner ramp portions and on their associated outer ramp portions adjacent said second horizontal axes, respectively, and associated bolt members for fixing said inner and outer ramp portions in predetermined positions of relative adjustment.

* * * * *